JOSEPH C. PIERCE.
Improvement in Wheels for Vehicles.
No. 115,981.            Patented June 13, 1871.
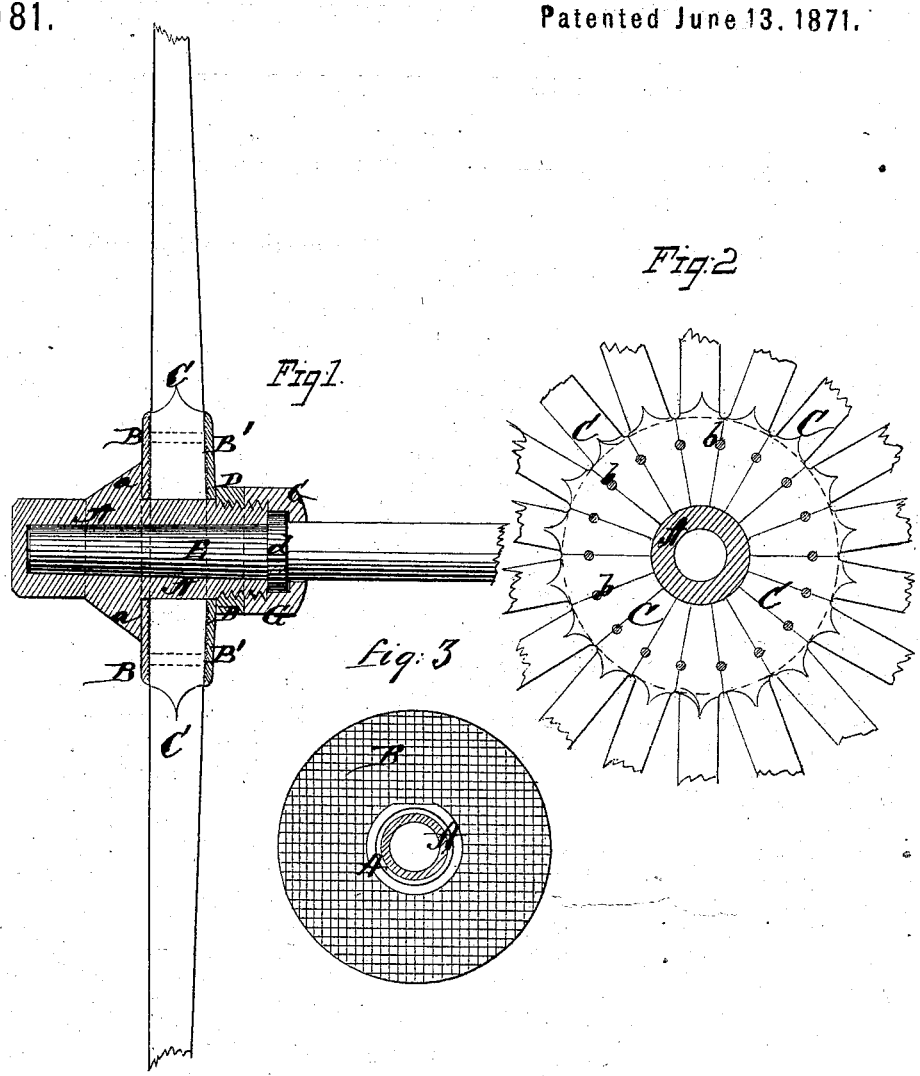

UNITED STATES PATENT OFFICE.

JOSEPH C. PIERCE, OF BRIDGEPORT, ILLINOIS.

IMPROVEMENT IN WHEELS FOR VEHICLES.

Specification forming part of Letters Patent No. 115,981, dated June 13, 1871.

*To all whom it may concern:*

Be it known that I, JOSEPH C. PIERCE, of Bridgeport, in the county of Lawrence and in the State of Illinois, have invented certain new and useful Improvements in Wheels for Vehicles; and do hereby declare that the following is a full, clear, and exact description thereof, reference being had to the accompanying drawing and to the letters of reference marked thereon making a part of this specification.

The nature of my invention consists in the construction and arrangement of a wheel for vehicles, as will be hereinafter more fully set forth.

In order to enable others skilled in the art to which my invention appertains to make and use the same, I will now proceed to describe its construction and operation, referring to the annexed drawing, in which—

Figure 1 is a longitudinal section of the hub, showing the spokes in the same. Fig. 2 is a transverse section, showing all the spokes in their positions; and Fig. 3 is a similar section with the spokes removed.

A represents the hub or boxing, closed at its outer end, and provided with a collar, $a$, by which the outside plate B is held in position. The box A is cut square, as shown in Fig. 3, and the center hole in the plate B has a corresponding square notch, whereby the plate is prevented from turning on the box. The inside of this plate B, as well as the opposing side of the inside plate B', is made checkered, so as the better to take hold of and secure the spokes C C. These spokes are made with a dovetail on the inside at the inner end, and fit together in wedge form, making a compact circle, as shown in Fig. 2, the connection of which is formed independent of all the other parts by tools made for the purpose, and held secure by keys $b\ b$ in each joint. The spokes are then unbolted from the table on which their connections are formed; the keys are then trimmed off smooth to the spokes, and the spokes held up self-sustaining and independent of the other parts. The spokes are then placed against the outside plate B on the box A, and the inside plate B' is then put on against the inner sides of the spokes. This plate is made to fit the dovetail on the spokes, so that when tightened by the nut D on the inner end of the box the spokes will be firmly secured between the plates, and cannot come loose. E represents the axle, provided with a collar, $d$, which, when the axle is inserted in the box, comes against the inner end thereof, and the wheel is then held on the axle by a connecting-nut, G, screwed onto the extreme end of the box A, as shown in Fig. 1.

Although not represented in the drawing, I intend to make oil-holes with screw through the box A, whereby the oiling may be accomplished without removing the wheel from the axle. I intend also to have oil-grooves in the boxing, by which the friction is lessened, and also serving as an oil-chamber.

Having thus fully described my invention, what I claim as new, and desire to secure by Letters Patent, is—

The combination of the hub or box A, flattened at its top, and with a collar, $a$, corrugated or checkered plates B B', flattened to correspond with the box, spokes C C, axle E with collar $d$, keys $b\ b$, and nuts D G, all constructed substantially as shown and described.

In testimony that I claim the foregoing I have hereunto set my hand this 8th day of April, 1871.

JOSEPH C. PIERCE.

Witnesses:
 DANIEL LEACH,
 LEWIS HUGHEY.